United States Patent
Saltel et al.

(10) Patent No.: US 8,499,799 B2
(45) Date of Patent: Aug. 6, 2013

(54) FLEXIBLE PIPE WITH IN-BUILT END PIECES

(75) Inventors: Jean-Louis Saltel, Le Rheu (FR); Benjamin Saltel, Cintre (FR); Gwenaël Tanguy, Plerin (FR); Samuel Thiebaut, Bruz (FR)

(73) Assignee: Saltel Industries, Bruz (FR)

(*) Notice: Subject to any disclaimer, the term of this patent is extended or adjusted under 35 U.S.C. 154(b) by 350 days.

(21) Appl. No.: 12/995,569

(22) PCT Filed: May 28, 2009

(86) PCT No.: PCT/EP2009/056550
§ 371 (c)(1),
(2), (4) Date: Dec. 16, 2010

(87) PCT Pub. No.: WO2009/147064
PCT Pub. Date: Dec. 10, 2009

(65) Prior Publication Data
US 2011/0100499 A1    May 5, 2011

(30) Foreign Application Priority Data

Jun. 2, 2008 (FR) .................................... 08 53612

(51) Int. Cl.
*F16L 11/00* (2006.01)
*F16L 31/00* (2006.01)

(52) U.S. Cl.
USPC ........ 138/109; 138/155; 138/125; 285/222.1; 285/222.2

(58) Field of Classification Search
USPC ............. 138/109, 155, 125, 127; 285/222.1, 285/222.2, 222.4
See application file for complete search history.

(56) References Cited

U.S. PATENT DOCUMENTS

| 3,874,064 A | 4/1975 | Chevalier |
| 4,225,158 A * | 9/1980 | Puechavy .................. 285/47 |

(Continued)

FOREIGN PATENT DOCUMENTS

| WO | WO 99/19655 A1 | 4/1999 |
| WO | WO 2007/112785 A1 | 10/2007 |

OTHER PUBLICATIONS

International Search Report for PCT/EP2009/056550 mailed Jul. 29, 2009.

*Primary Examiner* — Patrick F Brinson
(74) *Attorney, Agent, or Firm* — Birch, Stewart, Kolasch & Birch, LLP

(57) ABSTRACT

This flexible pipe comprises a versatile and flexible tubular body (PP) which comprises, from the outside toward the inside, a pressure arch (1b-1c) with filaments (10) submerged in a layer of elastomer and wound in a helix with an angle of 54.7° in relation to the profile plates and an attached sealing layer (1a), as well as a pair of rigid end connector tips (EC) which comprises two coaxial cylindrical sleeves, an inner one (2) in which the sealing layer (1a) is fitted and held, and an outer one (7) which extends axially from the body side (PP) beyond the inner sleeve (2) while surrounding the transitional area, with variable diameter, of the pressure arch; the connector end is provided with a pair of flexible annular support elements (5, 6) with variable profile, arranged at this transitional area and inserted between the sealing layer (1a) and the pressure arch (1b-1c), and between the pressure arch (1b-1c) and the flange (7), respectively, avoiding shearing of the filaments upon inflation.

A pipe of this type is intended in particular for the oil industry, for the transport of liquids or gases.

11 Claims, 3 Drawing Sheets

U.S. PATENT DOCUMENTS

| | | | |
|---|---|---|---|
| 4,259,553 A * | 3/1981 | Tanaka et al. | 200/81 R |
| 4,366,842 A * | 1/1983 | Peavy et al. | 138/109 |
| 4,895,185 A * | 1/1990 | Champleboux et al. | 138/109 |
| 5,443,099 A * | 8/1995 | Chaussepied et al. | 138/109 |
| 5,518,034 A * | 5/1996 | Ragout et al. | 138/104 |
| 5,654,499 A * | 8/1997 | Manuli | 73/40.5 R |
| 6,070,617 A * | 6/2000 | Honda et al. | 138/104 |
| 6,315,002 B1 * | 11/2001 | Antal et al. | 138/109 |
| 6,874,542 B2 * | 4/2005 | Mayau et al. | 138/109 |
| 7,631,667 B2 * | 12/2009 | Brink et al. | 138/109 |

\* cited by examiner

FLEXIBLE PIPE WITH IN-BUILT END PIECES

The present invention concerns a flexible pipe, and more specifically a flexible pipe with integrated end tips.

Its structure is particularly, but not necessarily, adapted to an application in the oil industry for transporting liquids or gases.

A flexible pipe of this type, which will hereinafter be referred to more simply as "cargo hose", generally has a fairly small length, rarely exceeding a dozen meters and allowing a flexible connection between fixed equipment.

When lengths larger than the available lengths are needed, several cargo hoses can be connected to each other.

Their interior diameter is relatively large, greater than 5 cm, typically between approximately 7 and 11 cm.

These cargo hoses, in particular in an environment in the oil industry, can be subjected to very severe strains.

The pressure of the effluents transported can exceed 700 bars (or 70 MPa) and their temperature can exceed 150° C. These effluents can be made up of liquids or gases which may be very corrosive, such as oil, aromatic liquids, water, hydrogen sulfur ($H_2S$), or carbon dioxide ($CO_2$).

Such cargo hoses may be exposed to quite varied outside stresses, such as high radial and axial stresses, tension on their ends during assembly, exposure to temperatures which may be between −40° C. and +70° C., or abrasion against the ground, in particular.

Their lifespan is varied depending on the application, but should generally be longer than 10 years, and their construction system must make it possible to guarantee the safety of people and the equipment.

They must be light, to facilitate their transport and handling, while also having significant flexing capabilities allowing them to adopt a small bend radius if necessary.

Overall, there are two major families of cargo hoses:
"bonded structure" cargo hoses, made up of filamentary strengtheners made in steel and/or a synthetic material (aramid fibers, in particular) incorporated within an elastomer material; these strengtheners, which generally have multiple layers, are embedded in the elastomer, such that the assembly forms an indissociable unit;
"non-bonded structure" cargo hoses, made up of layers of steel components ensuring the mechanical performance, and layers of components in plastic material ensuring sealing, with the possibility of relative sliding between these two types of layers.

In the description which follows, as well as in the claims, we will conventionally use the general term "filament" to designate a cable, yard, fiber or roving.

Understood by the term:
"fiber", an elementary cylindrical formation with a very small diameter, generally in a synthetic or organic material or steel and most often assembled in the form of yarn or roving;
"roving", a long strand with a small section, made up of parallel fibers, usually designated by this term in the oil industry;
"yarn", a long strand with a small diameter made up of fibers twisted and spun together, usually designated by this term in the oil industry;
"cable", a bundle of synthetic or steel yarns, woven together.

The aim of the invention is to propose a cargo hose having the following characteristics and advantages:

a) resistance to high pressure, greater than 700 bars (or 70 MPa), with a significant interior diameter (greater than 50 mm);

b) lightness, with a linear mass not exceeding several kilograms per meter;

c) ability to adopt a small bend radius;

d) structure provided with a strengthener made up of several layers of synthetic filaments having both a very high tensile strength and a maximum elongation limited to approximately 5%;

e) resistance to corrosive environments ($H_2S$, $CO_2$ and water, in particular);

f) structure able to be manufactured such that its two end connector tips are indissociable from its main flexible cylindrical portion, so as to preserve the winding continuity of the fibers of each of the layers;

g) structure provided with a system for fastening each layer to the end tips, without crimping (which could cause shearing of the filaments);

h) adoption of a compromise between the two aforementioned families of cargo hoses, such that its main portion-or body-, which picks up the pressure, constitutes a bonded structure, while the sealing layer, made in a plastic or elastomer material, is removable and interchangeable like a non-bonded structure, with the possibility of relative sliding of these two elements.

The cargo hose according to the invention, which makes it possible to meet the aforementioned requirements, comprises a versatile and flexible tubular main portion, or body, which is made up of at least two coaxial tubular elements, and which is sealably connected at each of its two ends to a rigid tubular connector tip.

According to the invention:
the two coaxial tubular elements making up said body consist, from the outside to the inside, of:
a) a pressure arch comprising several layers of filaments with a small thickness having a high tensile strength, wound in a helix and in opposition with a wrapping angle in relation to the profile plates which is constant and substantially equal to 54.7°, these filaments being incorporated into an elastomer layer;
b) an attachable sealing layer in a plastic material (polyamide, for example) or elastomer, the outer surface of which is in contact with the inner surface of the pressure arch, but without being integral therewith, such that a slight relative sliding between these two layers is possible upon inflation of the cargo hose caused by a high internal pressure;
the connector tip comprises two coaxial cylindrical sleeves integral with each other, namely:
α) an inner sleeve, the internal diameter of which is equal to the external diameter of the sealing layer, such that the latter fits without play in the inner sleeve and is held there at its free end portion by a mechanical blocking member, the external diameter of this sleeve being slightly larger than the internal diameter of the pressure arch, the latter part surrounding the inner sleeve with a certain degree of gripping and being secured thereon, while also being separated from the sealing layer;
β) an outer sleeve, or flange, the internal diameter of which is slightly larger than the external diameter of the pressure arch, this flange extending axially from the cargo hose body over a length larger than that of the inner sleeve while surrounding, with some play, the transitional area, with variable diameter, from the pressure arch;
the connector tip is provided with a pair of annular support elements (rings) in a flexible and elastically deformable material and with a variable profile and arranged at said transitional area of the pressure arch, one inserted between the sealing layer and the pressure arch and the other inserted between the pressure arch and the flange.

Thanks to this arrangement, one avoids shearing of the filaments in the connection area of the cargo hose body with the end tip, even in case of high internal pressure. Inflation of the support elements is controlled by the flange, which absorbs the radial stresses.

Moreover, according to a certain number of possible additional, but non-limiting, characteristics of the invention:

said versatile and flexible tubular main portion, or body, comprises a third tubular element coaxially surrounding the other two, namely a flexible protective steel casing, to which said outer sleeve is connected;

said filaments are in a synthetic material, for example in aramid;

said tips are provided, at their periphery, with an assembly of fastening members positioned in the alignment of the filaments, and each layer comprises an uninterrupted network of filaments connecting the two tips to each other alternatively in one direction, then in the other, while bypassing said fastening members, while catching on them;

said sealing layer is removable and interchangeable;

said mechanical blocking member is a conical clamping ring penetrating into the mouth of the sealing layer;

the annular support element inserted between the sealing layer and the pressure arch has a central area with a maximal thickness, and portions becoming progressively thinner on either side of this central area, with a thickness decreasing toward the outside and toward the inside;

the annular support element bears, via the thinner portion located on the side of the tip against the inner wall, of complementary profile, of the free end portion of said inner sleeve;

the thinner portion located on the body side of the annular support element is axially opposite the substantially conical end portion, of complementary profile, of the other annular support element inserted between the pressure arch and the flange;

the annular support element inserted between the pressure arch and the flange constitutes an end bead of a membrane in an elastomer material forming an integral part of the pressure arch;

the portion of said filaments which surrounds the inner sleeve of the connector tip is coated in a resin run between the inner and outer sleeves.

As indicated above, each of the layers of filaments which makes up the pressure arch is therefore advantageously of the "continuous" type, formed by a single helically wound filament going back and forth between the two ends of the cargo hose, and going around fastening members; the latter parts are, for example, sprockets integral with the end tip, according to an arrangement known by document WO 2007/112785 in the applicant's name, to which one may refer as needed.

These sprockets here will be arranged at the periphery of the inner sleeve.

Furthermore, holding of the end portion of the pressure arch around this inner sleeve is advantageously strengthened by the presence of a hardenable resin which is run in the annular interval separating the latter part from the outer sleeve; the end portion of the pressure arch is thus embedded and held in the resin.

It should be noted that according to a recommendation of the aforementioned document WO 2007/112785, the sealing connection of the cargo hose body with the end connector tips is obtained due to the fact that the wrapping angle of the filaments in relation to the profiling plates at these tips is greater than 54.7°, and advantageously between 56° and 65°, such that, under the effect of an internal pressure reigning in the pipe, the tension created on the filaments tends to tighten the layers on the sealing sheath and on said end tips.

Although this principle of winding the filaments with a variable pitch is satisfactory technically, it nevertheless poses a drawback related to the fact that the surface density of the filaments in the cargo hose body is necessarily smaller than at its ends, due to the difference in their slopes; indeed, two adjacent filaments which are in contact with a given wrapping angle, as defined above, will be spaced apart from each other if this angle is smaller.

Thanks to the combination of means according to the invention, as stated above, a constant wrapping angle, substantially equal to 54.7° in relation to the profiling plates, can be kept over the entire length of the cargo hose, including at its end tips, which resolves this density problem and, furthermore, facilitates the method for manufacturing the product.

Other characteristics and advantages of the invention will appear from the description thereof which will now be provided, in reference to the appended drawings which illustrate, as an example, one possible embodiment, and in which.

Figure 1:
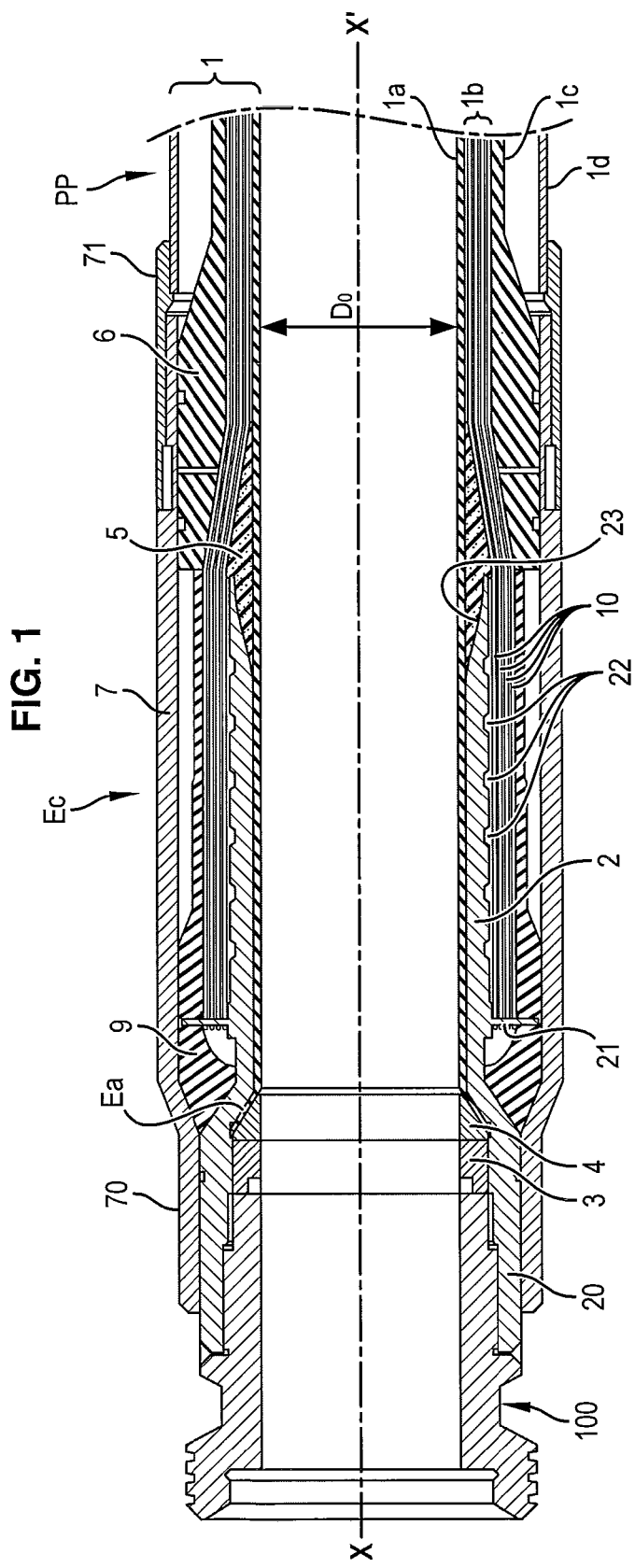
FIG. 1 is a partial view, in axial cross-section, of an end portion of a flexible pipe according to the invention, illustrated at an end connector tip, this pipe not being subject to a high internal pressure.

In FIG. 1 we have designated by references PP and EC, respectively, the cargo hose body-partially visible—and one of its end tips (left tip).

A similar assembly is naturally provided at the other end of the pipe, for the right tip.

Each tip has an end portion 100 adapted to be connected to the similar tip of an adjacent cargo hose, through a sealing connection of a known type, for example by screwing.

The cargo hose body PP has a cylindrical wall 1 with axis X-X' with a multi-layer structure comprising, from the outside toward the inside, a protective steel casing 1d, a pressure arch 1b-1c, and an attachable sealing layer 1a. The pressure arch is in contact, via its inner surface, with the outer surface of the sealing layer. However, it is separated from the casing 1d, of larger diameter, which surrounds it.

The pressure arch 1b-1c comprises a core in an elastomer material inside which several layers of filaments 10 of smaller thickness with high tensile strength are incorporated.

These are wound in a helix and in opposition, with a wrapping angle in relation to the profiling plates which is constant and substantially equal to 54.7°; as was recalled in the aforementioned document WO 2007/112785 (see in particular page 12, lines 6-12), this angle value ensure balance of the layer, which does not tend to deform radially or axially under the effect of an internal pressure.

The filaments can, however, get longer when they are subjected to a high tension stress generated by internal pressure.

The sealing layer 1a is, for example, in a flexible and elastically deformable material, for example in plastic or an elastomer material, the quality of which is chosen to mechanically, thermally or chemically resist the attacks of the fluid to be transported in the pipe, as well as the various stresses related to the considered application, while ensuring complete sealing.

Its outer surface is in contact with the inner surface of the pressure arch 1b-1c, but without being integral therewith, by bonding or any other means; thus a relative sliding between these two layers in the axial direction is possible.

The connector tip EC, also centered on X-X', is made up of parts in rigid material, for example in steel.

It comprises an inner sleeve 2 whereof the internal diameter is equal to the external diameter of the sealing layer 1a, and an outer sleeve, or flange, 7 which extends axially from the flexible body PP (toward the right of the figure); as a result, this has a larger length than that of the inner sleeve 2.

The inner sleeve 2 has an enlarged free end 20, with a larger diameter, in which the end portion 100 is inserted and screwed.

The transition from this larger end portion 20 with the rest of the sleeve 2 is done via an intermediate area with a conical wall. The sealing layer penetrates it completely, coaxially, inside the main portion of the sleeve 2, up to this intermediate area; the internal surface of the latter part serves as a seat for the mouth Ea of the sealing layer 1a. This mouth therefore also assumes a conical form and is applied against its seat by a blocking ring 4 with a complementary conical surface. This is stressed by an intermediate ring 3, itself stressed by the screwed element 100 so as to ensure a certain gripping of the mouth Ea between its seat and the ring 4 and to ensure good sealing at this level.

Ad-hoc sealing devices (not shown) are also provided to ensure sealing of the connections between the elements 100, 3 and 20.

The latter parts have a central opening with a circular section and with axis X-X', the diameter of which is equal to the interior diameter $D_0$ of the sealing layer 1a when the cargo hose is at rest (not inflated).

The external diameter of the inner sleeve 2 is slightly larger than the internal diameter of the pressure arch 1b-1c; this is fitted on the inner sleeve with a certain degree of gripping; at this level it is therefore separated from the sealing layer 1a, the wall of the main portion of the inner sleeve 2 being sandwiched between the pressure arch and the sealing layer.

In the outer end zone (on the left in the figures) of its main portion, therefore close to the transitional area mentioned above, the sleeve 2 is provided with a plurality of sprockets 21 arranged radially along a circumference, toward the outside of the wall. These sprockets are used for fastening the filaments making up each layer, which bypass the sprockets, according to an arrangement similar to that described and shown in WO 2007/112785.

The inner end zone (on the right of the figures) is connected, via a shell 71, to the free end portion of the casing 1d. These connections are done by bonding, for example.

In the annular interstitial space which separates the two sleeves 2 and 7, a hardenable resin can be injected in vacuum.

Once hardened, this resin 9 covers the end portion of the pressure arch as well as the sprockets 21 and the filaments 10 which bypass them.

In this way one obtains a mechanically resistant connection of the pressure arch with the tip; this connection is also strengthened by the presence of a series of annular grooves 22 hollowed out at the periphery of the wall of the sleeve 2, which tends to oppose the sliding of the pressure arch in case of axial tension.

According to one characteristic of the invention, the connector tip EC is provided with a pair of annular support elements-or rings-5, 6 in a flexible and elastically deformable material and with a variable profile.

One of these elements, referenced 5, has an approximately biconical outer shape, having a central area with a larger diameter, the thickness of which corresponds substantially to the thickness of the inner sleeve 2. It has a cylindrical central opening whereof the diameter is equal to the outer diameter of the sealing layer 1a, which goes through it.

The element 5 is inserted between the sealing layer 1a and the pressure arch 1b-1c, and adjoins the mouth of the inner sleeve 2. More precisely, the inner wall 23 of the mouth of the sleeve 2 has a substantially conical profile complementary to the outer portion (tip EC side) of the element 5. Its inner portion (body PP side) has a conical portion which bears against the inner wall of the pressure arch, in the transitional area for change of diameter of this pressure arch.

The other element 6 is an end bead of a membrane 1c forming the outer layer of the pressure arch.

Its outer diameter is equal to the inner diameter of the flange 7.

The element 6 is fitted in the inner inlet portion (body PP side) of this flange. Its central opening flares out from the outer side (tip EC side) in order to assume a substantially conical profile, complementary to that of the transitional area for change of diameter of the pressure arch 1b.

Thus this transitional area is inserted between the two flexible and elastic inner 5 and outer 6 elements.

Figure 2:
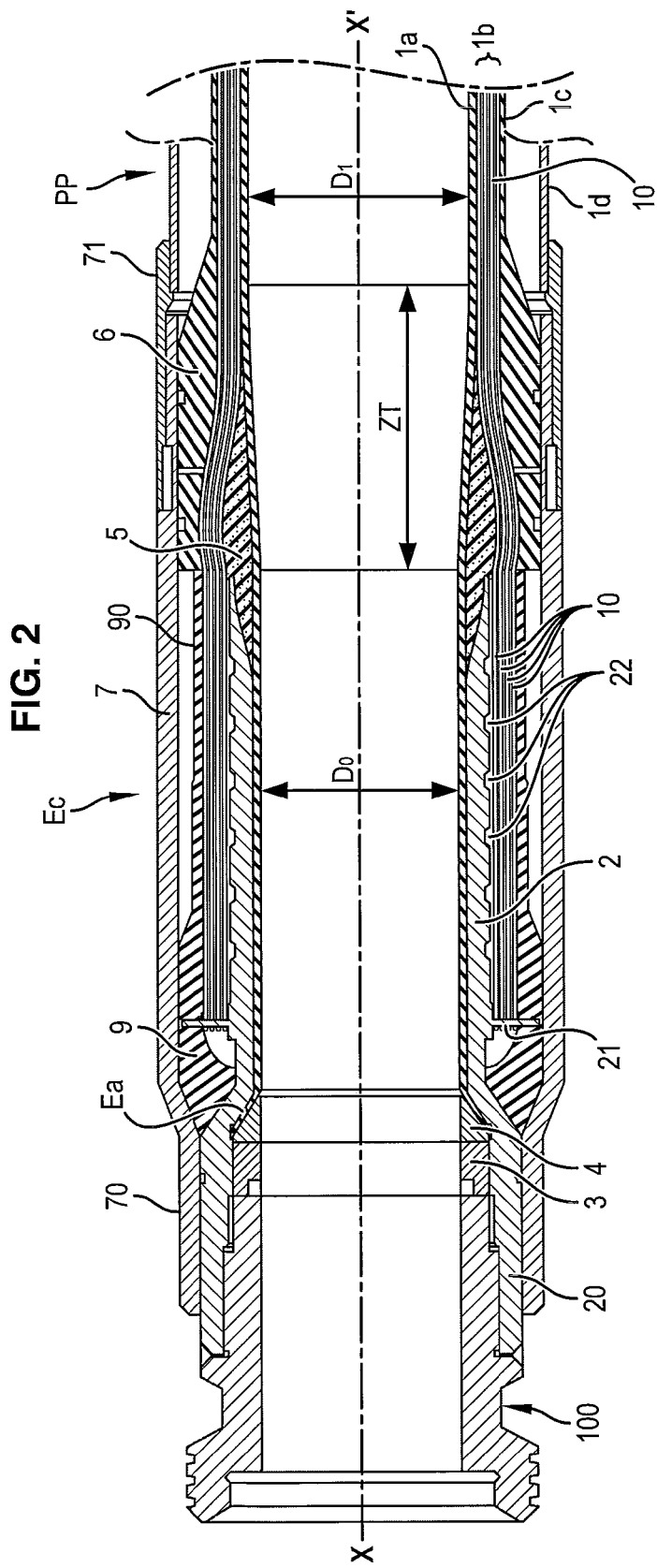
FIG. 2 is a view similar to that of FIG. 1, the pipe being subject to radial expansion under the effect of an internal fluid pressure.
Figure 3:
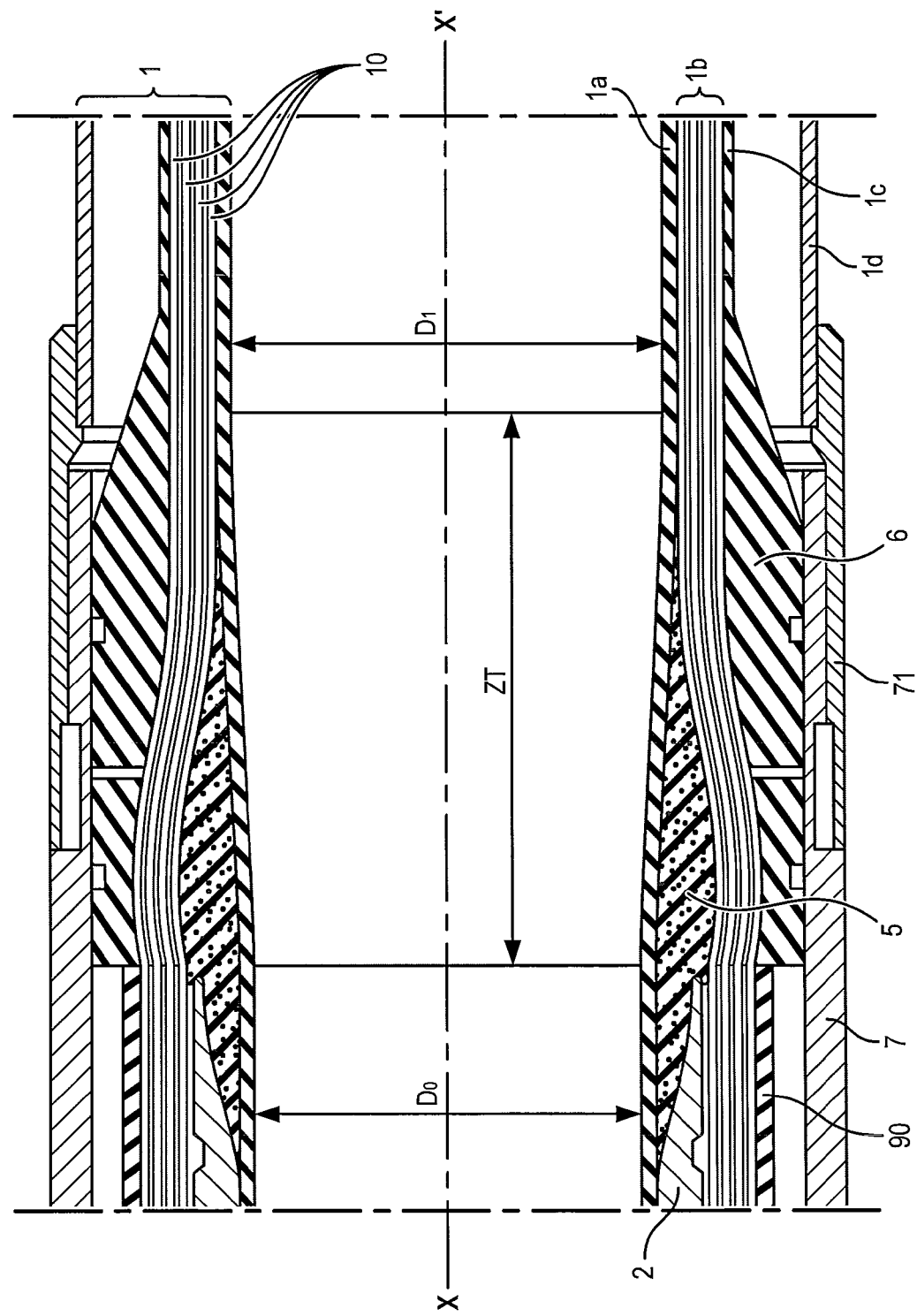
FIG. 3 is a partial view, on a larger scale, similar to that of FIG. 2.

By referring more particularly to FIGS. 2 and 3, we will now describe the behavior of the cargo hose at an end tip EC when it is subjected to a strong internal pressure.

This overpressure causes a radial expansion of the layers 1a and 1b-1c of the cargo hose body PP. The outer protective casing 1d, which is non-expanding, does not hinder this expansion because its inner diameter is substantially larger than the outer diameter of the pressure arch.

The inner diameter of the sealing layer, initially equal to $D_0$, goes to a value $D_1 > D_0$. This increase in diameter involves a lengthening of the filaments 10 (which can, for information, reach 5%), but without varying their wrapping angle.

In the transitional area between the two diameters, which is designated ZT in FIGS. 2 and 3, one observes crushing, toward the outside, of the flexible support element 5, which in turn pushes the portion 1b of the pressure arch outwards, which bears against the other flexible support element 6, crushing it.

These stresses are absorbed by the rigid tubular flange 7.

Thus, the progressive inflation of the layers 1a and 1b is completely controlled, without risk of shearing of the filaments 10.

It should be noted that the connection of the end connector tips EC with the cargo hose body PP is done without crimping.

In case of wear or deterioration of the sealing layer 1a (cracking, for example), this can easily be replaced. To do this, one need only unscrew the connector elements 100, remove the blocking rings 3 and 4, remove the sealing layer 1a via axial tension, replace it with a new one, then block the ends thereof by replacing the elements 4, 3 and 100.

It is not necessary to replace the entire cargo hose, which is economically interesting.

The flange 7 only ensures absorption of radial stresses, but not axial holding of the body in the tip, this holding being ensured through the securing of the layers of filaments with each tip.

The number and dimensions of the sprockets 21 are naturally chosen according to the characteristics required for use, and in particular the diameter of the filaments and the number of layers implemented.

The fastening members are not necessarily sprockets, nor a fortiori cylindrical fingers; they can consist, for example, of hooks, teeth and/or slots, in particular.

Instead of a single set of sprockets (or similar fastening members) arranged in a same transverse plane, it would naturally be possible to provide several similar sets, for example two or three sets, slightly offset axially.

The filaments can have a circular section, but this is not required.

They are made in a material with high tensile strength.

Suitable materials include synthetic materials, in particular aramid, but also carbon, glass and steel.

The filaments must be sufficiently fine and flexible to be able to bypass the fastening members, sprockets or others as closely as possible.

The invention claimed is:

1. A flexible pipe, which comprises a versatile and flexible tubular main portion, or body, which is made up of at least two coaxial tubular elements and which is sealably connected at each of its two ends to a rigid tubular connector tip, wherein:
   the two coaxial tubular elements making up said body consist, from the outside toward the inside, of:
   a) a pressure arch comprising several layers of filaments with a small thickness having a high tensile strength, wound in a helix and in opposition with a wrapping angle in relation to a generatrix of said tubular elements which is constant and substantially equal to 54.7°, these filaments being incorporated into a layer of elastomer;
   b) an attachable sealing layer in a plastic material or elastomer, the outer surface of which is in contact with the inner surface of the pressure arch (1b-1c), but without being integral therewith, such that a slight relative sliding between these two layers is possible upon inflation of the flexible pipe caused by a high internal pressure;
   the rigid tubular connector tip comprises two coaxial cylindrical sleeves integral with each other, namely:
   α) an inner sleeve, the internal diameter of which is equal to the external diameter of the sealing layer, such that the latter fits without play in the inner sleeve and is held there at its free end portion by a mechanical blocking member, the external diameter of this inner sleeve being slightly larger than the internal diameter of the pressure arch, the latter part surrounding the inner sleeve with a certain degree of gripping and being secured thereon, while also being separated from the sealing layer;
   β) an outer sleeve, or flange, the internal diameter of which is slightly larger than the external diameter of the pressure arch, this flange extending axially from the flexible pipe body over a length larger than that of the inner sleeve while surrounding, with some play, a transitional area, with variable diameter, from the pressure arch;
   the rigid tubular connector tip is provided with a pair of annular support elements-or rings-in a flexible and elastically deformable material and with a variable profile, arranged at said transitional area of the pressure arch, one inserted between the sealing layer (1a) and the pressure arch and the other inserted between the pressure arch and the flange.

2. The flexible pipe of claim 1, wherein said main portion comprises a third tubular element coaxially surrounding the other two, namely a flexible steel protective casing, to which said outer sleeve is connected.

3. The flexible pipe of claim 1 or claim 2, wherein said filaments are in a synthetic material, for example in aramid.

4. The flexible pipe according to claim 1, which comprises a rigid tubular connector tip at each end of said flexible tubular main portion of said flexible pipe wherein on one hand, said rigid tubular connector tips are provided at their periphery with a set of fastening members positioned in the alignment of the filaments, and that, on the other hand, each layer comprises a network of uninterrupted filaments connecting the rigid tubular connector tips to each other alternatively in one direction, then in the other, while bypassing said fastening members, while catching on them.

5. The flexible pipe according claim 1, wherein said sealing layer is removable and interchangeable.

6. The flexible pipe according to claim 5, wherein said mechanical blocking member is a conical clamping ring penetrating into the mouth of the sealing layer.

7. The flexible pipe according to claim 1, wherein the annular support element inserted between the sealing layer and the pressure arch has a central area of maximal thickness, and portions becoming progressively thinner on either side of this central area, with a thickness decreasing toward the outside and toward the inside.

8. The flexible pipe according to claim 7, wherein the annular support element bears by its thinner portion located on the tip side against the inner wall, of complementary profile, of the free end portion of said inner sleeve.

9. The flexible pipe according to one of claims 7 or 8, wherein the thinner portion located on the body side of the annular support element is axially opposite the substantially conical end portion, of complementary profile, of the other annular support element inserted between the pressure arch and the flange.

10. The flexible pipe according to claim 1 wherein the annular support element inserted between the pressure arch and the flange constitutes an end bead of a membrane in an elastomer material forming an integral part of the pressure arch.

11. The flexible pipe according to claim 1 wherein the portion of said filaments which surrounds the inner sleeve of the connector tip is coated in a resin run between the inner and outer sleeves.

* * * * *